(12) United States Patent
Ren et al.

(10) Patent No.: US 9,342,697 B1
(45) Date of Patent: May 17, 2016

(54) SCALABLE SECURITY POLICY ARCHITECTURE FOR DATA LEAKAGE PREVENTION

(75) Inventors: Liwei Ren, Sunnyvale, CA (US); Dehua Tan, San Jose, CA (US); Yingqiang Lin, San Jose, CA (US)

(73) Assignee: Trend Micro Incorporated, Tokyo (JP)

( * ) Notice: Subject to any disclaimer, the term of this patent is extended or adjusted under 35 U.S.C. 154(b) by 1463 days.

(21) Appl. No.: 12/421,217

(22) Filed: Apr. 9, 2009

(51) Int. Cl.
*G06F 21/60* (2013.01)
*H04L 29/06* (2006.01)

(52) U.S. Cl.
CPC .............. *G06F 21/60* (2013.01); *G06F 21/606* (2013.01); *H04L 63/20* (2013.01)

(58) Field of Classification Search
USPC .................................................. 726/1, 4, 26
See application file for complete search history.

(56) References Cited

U.S. PATENT DOCUMENTS

| | | | |
|---|---|---|---|
| 6,493,709 B1 | 12/2002 | Aiken | |
| 7,031,972 B2 | 4/2006 | Ren et al. | |
| 7,516,130 B2 | 4/2009 | Ren et al. | |
| 7,730,138 B2 * | 6/2010 | Ballinger et al. | 709/206 |
| 8,181,033 B1 * | 5/2012 | Paul et al. | 713/187 |
| 2002/0087479 A1 * | 7/2002 | Malcolm | 705/64 |
| 2003/0065937 A1 | 4/2003 | Watanabe et al. | |
| 2006/0253439 A1 | 11/2006 | Ren et al. | |
| 2008/0016228 A1 | 1/2008 | Cho | |
| 2009/0300751 A1 * | 12/2009 | Krishnamurthy et al. | 726/13 |
| 2010/0254615 A1 * | 10/2010 | Kantor et al. | 382/218 |

OTHER PUBLICATIONS

W3Schools.com—XML Schema Why. Feb. 5, 2005. http://www.w3schools.com/Schema/schema_why.asp.*
w3schools.com—XML DOM Tutorial. May 9, 2008. http://web.archive.org/web/20080509150524/http://www.w3schools.com/dom/default.asp.*
LeakProof 3.1, Comprehensive protection of sensitive data at rest, in use, and in motion, 2008 by Trend Micro Incorporated, pp. 1-2.
Muhammad Sharif, et al. "Multiple Values Search Algorithm" 2007—Spring 2008, pp. 49-58, vol. 1, No. 2, Journal of Information & Communication Technology.
Chakrabarti, et al. "Scalable feature selection, classification and signature generation for organizing large text databases into hierachical taxonomies", 1998, pp. 163-178, vol. 7, No. 3, VLDB Journal.
Anagnostopoulos, A. et al., "Sampling Search-Engine Results," Proceedings of the 14th International Conference on World Wide Web, WWW 2005, May 10-14, 2005, pp. 245-256, Chiba, Japan.

(Continued)

*Primary Examiner* — Robert Leung
*Assistant Examiner* — Ngoc D Nguyen
(74) *Attorney, Agent, or Firm* — Okamoto & Benedicto LLP

(57) ABSTRACT

One embodiment relates to an apparatus for creating and managing security policies for data leakage prevention. The apparatus includes a database which stores three layers of objects comprising digital assets, content templates, and security policies, and a user interface configured to access said database so as to provide for input and editing of said three layers of objects. The security policies may include at least a target element, an action element, and a condition element. A content template may be used to form the condition element. Content templates may include compliance templates which are configured to satisfy specific regulatory requirements and other templates to protect specified types of information. Other embodiments, aspects and features are also disclosed.

20 Claims, 4 Drawing Sheets

(56) References Cited

OTHER PUBLICATIONS

Chen. J., et al., "Knowledge Discovery and Data Mining Based on Power Plant Real-Time Database: A Survey," Proceedings of International Conference on Power Engineering, Oct. 8-12, 2001, pp. 1-5, Xi'an, China.

Chen, L., et al., "Template Detection for Large Scale Search Engines," SAC '06, Apr. 23-27, 2006, 5 pages, Dijon, France.

Hamilton. N., "The Mechanics of a Deep Net Metasearch Engine," Proceedings of the 12th International World Wide Web Conference, 2003, 2 pages.

Jessop, M., et al., Pattern Matching Against Distributed Datasets, 2004, 6 pages.

Lai, W.C., et al., "An Anatomy of a Large-Scale Image Search Engine," IEEE MSE, Dec. 2002, 4 pages, Irvine.

Lavrenko, V., et al., "Relevance Models for Topic Detection and Tracking," 2002, 6 pages.

Pallickara, S. et al., "Incorporating an XML Matching Engine in Distributed Brokering Systems," Proceedings of the International Conference on Parallel and Distributed Processing Techniques and Applications, (PDPTA '03) 2003, pp. 1-7.

\* cited by examiner

SCALABLE SECURITY POLICY ARCHITECTURE FOR DATA LEAKAGE PREVENTION

BACKGROUND

1. Field of Art

The present invention relates generally to computer and data security, and more particularly, to the field of data leakage prevention.

2. Description of the Related Art

Loss of proprietary information and intellectual property can trigger fines, litigation, brand damage, and bad press. To protect sensitive data, enterprises need an effective data leak prevention (DLP) solution that monitors potential information leaks at the point of use. However, the explosion of messaging systems, wireless networking, and universal serial bus (USB) storage devices has made the protection of critical enterprise data difficult. As a result, enterprises are experiencing an increase in the loss and even theft of data assets by employees or contractors or even hackers (and malwares) who maliciously or accidentally leak data.

SUMMARY

One embodiment relates to an apparatus for creating and managing security policies for data leakage prevention. The apparatus includes a database which stores three layers of objects comprising digital assets, content templates, and security policies, and a user interface configured to access said database so as to provide for input and editing of said three layers of objects. The security policies may include at least a target element, an action element, and a condition element. The security policies may also include a channel element to handle data-in-motion. A content template may be used to form the condition element. Content templates may include compliance templates which are configured to satisfy specific regulatory requirements and other use cases to protect specified types of information.

Another embodiment relates to a data leakage prevention apparatus which includes a database and a policy engine. The database is configured to store objects representing digital assets, content templates, and security policies, while the policy engine is configured to interpret said objects so as to execute the security policies contained in said objects. Said content templates are used to define a condition element of the security policies and are associated with one or more of the digital assets.

Other embodiments, aspects and features are also disclosed.

BRIEF DESCRIPTION OF DRAWINGS

The disclosed embodiments have other advantages and features which will be more readily apparent from the following detailed description and the appended claims, when taken in conjunction with the accompanying drawings, in which:

DETAILED DESCRIPTION

Example Computer Apparatus

Figure 1:
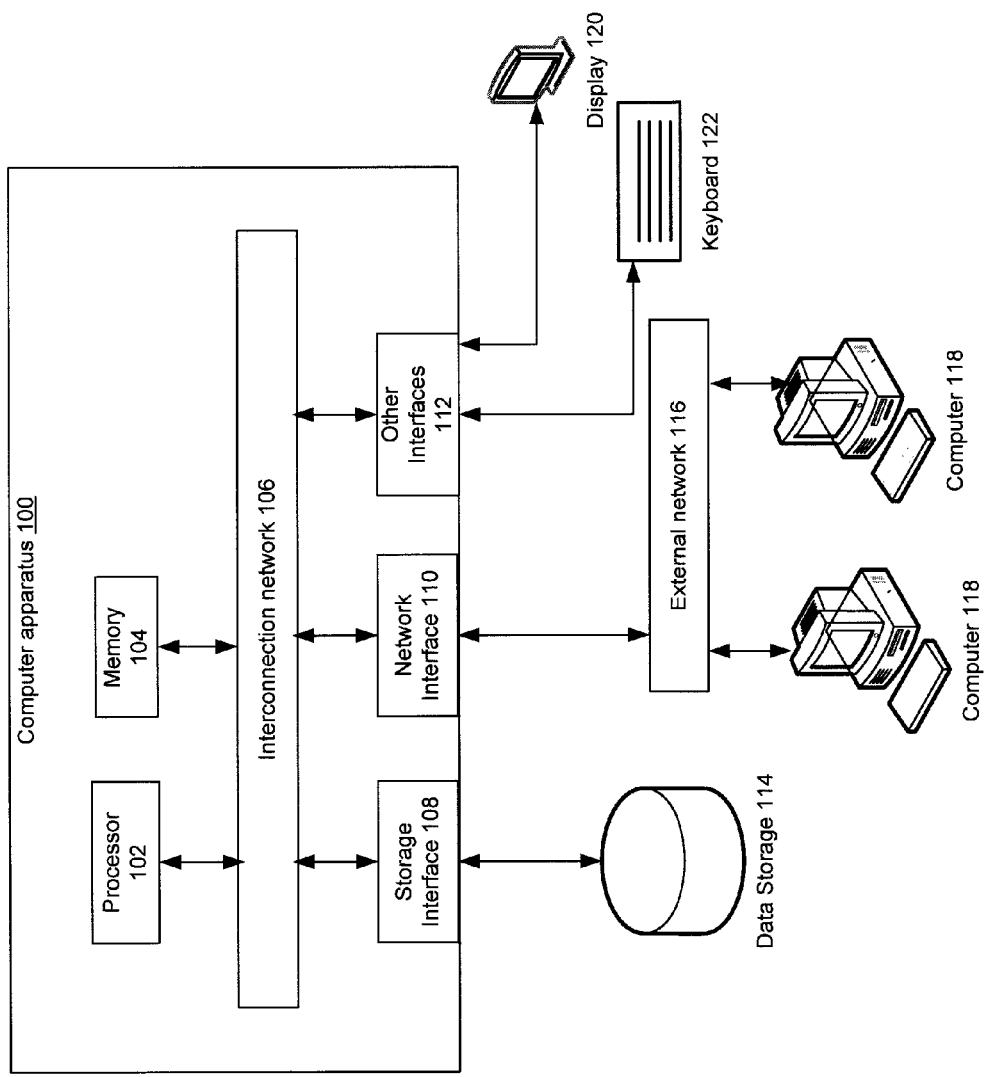
FIG. 1 is a schematic diagram depicting an example computer apparatus which may be configured to implement server and agent components of a data leakage prevention system.

FIG. 1 is a schematic diagram depicting an example computer apparatus 100 which may be configured to implement various components of the data leakage prevention system in accordance with an embodiment of the invention. Of course, other designs for the computer apparatus may be used in alternate embodiments. Embodiments of the present invention may be performed by multiple computer apparatus 100 communicatively interconnected by a network.

As shown in FIG. 1, the example computer apparatus 100 comprises a processor 102, a computer-readable memory system 104, a storage interface 108, a network interface 110, and other interfaces 112. These system components are interconnected through the use of an interconnection network (such as a system bus or other interconnection system) 106. The memory 104 may be configured to include, in addition to other components and data, processor-executable instructions to perform various method steps disclosed herein.

The storage interface 108 may be used to connect storage devices 114 to the computer apparatus 100. The network interface 110 may be used to communicate with other computers 118 by way of an external network 116. The other interfaces may interface to various devices, for example, a display 120, a keyboard 122, and other devices.

Shortcomings of Conventional DLP Security Policy Schemes

Achieving regulatory compliance with business governance and privacy regulations, such as SB-1386 (California Security Breach Information Act), GLBA (Gramm-Leach-Bliley Act), EU DPD (European Union's Data Protection Directive), SOX (Sarbanes-Oxley Act), and HIPAA (Health Insurance Portability and Accountability Act), requires comprehensive security policies to keep information confidential and protect customer privacy. In order to meet these challenges, conventional data leakage prevention systems use a variety of different schemes to specify security policies.

Conventional DLP security policy schemes have various shortcomings First, conventional schemes do not readily support the growing set of DLP security policies necessary to meet increasingly numerous and demanding compliance regimes, such as SOX, J-SOX (Japanese Sarbanes-Oxley type requirement), SB-1386, PCI DSS (Payment Card Industry Data Security Standard), HIPAA, GLBA, ITAR (International Traffic in Arms Regulations), and so on. Second, conventional schemes are difficult and complicated for customers to implement. Third, conventional schemes lack interoperability and portability between DLP systems from different vendors.

Scalable, Generically-Applicable Framework for DLP Security Policies

Applicants have determined that conventional data leakage prevention (DLP) systems lack a scalable, generically-applicable framework for DLP security policies. Achieving such a framework is very difficult and highly challenging problem due to the increasing multitude of regulatory compliance regimes, such as SOX, J-SOX, SB-1386, PCI, HIPAA, GLBA, ITAR, and so on. Applicants have considered and analyzed this problem to derive the innovative policy framework disclosed herein.

The present application discloses a unified framework for DLP security policies that overcomes shortcomings in conventional DLP security policy schemes. In one embodiment, the unified framework comprises a three-layer structure which provides a generically-applicable and scalable framework for DLP security policies.

Figure 2:
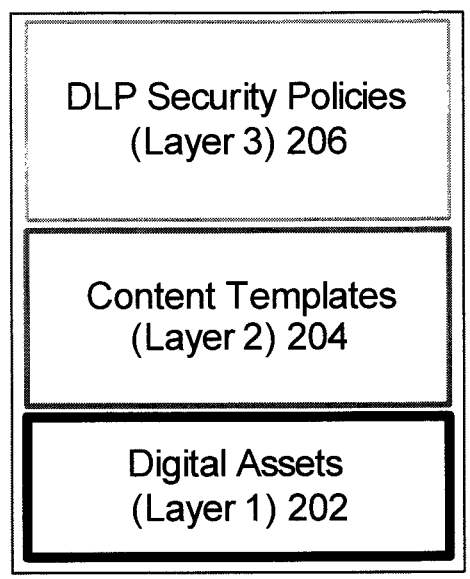
FIG. 2 depicts a three-layer structure for data leakage prevention (DLP) security policies in accordance with an embodiment of the invention.

FIG. 2 depicts a three-layer structure for data leakage prevention (DLP) security policies in accordance with an embodiment of the invention. As seen, the three-layer structure includes a digital assets layer (Layer 1) 202, a content templates layer (Layer 2) 204, and a DLP security policies layer (Layer 3) 206. This three-layer structure is described in detail below.

DLP Security Policies (Layer 3)

In accordance with an embodiment of the invention, the overall task of data leakage prevention may be divided into two sub-tasks. A first sub-task involves preventing sensitive "data-in-motion" from leakage. Data-in-motion refers to data which is being transmitted from inside an organization's network to outside the organization's network. The transmission of the data-in-motion may be by way of electronic mail, ftp (file transfer protocol), hyper text transfer protocol (HTTP/HTTPS), instant messaging (IM), drivers for removable storage, printer drivers, or other data communication channels. A second sub-task involves discovering sensitive "data-at-rest," such as personal information, proprietary design documents, and so forth. Discovering data-at-rest provides visibility as to the distribution of confidential information across an organization's network.

In accordance with an embodiment of the invention, a first DLP policy model (Model 1) is provided for use with data-in-motion, and a second DLP policy model (Model 2) is provided for use with data-at-rest. Basic parameters of these models are outlined below.

Model 1 for Data-in-Motion: If data flows from TARGET to outside organization's network via CHANNEL with CONDITION, then do ACTION.
  TARGET—an individual endpoint/user, a group of endpoints/users, or all endpoints/users.
  CHANNEL—drivers for removable storage (CD, DVD, USB, etc.), web mail, electronic mail, FTP, HTTP/HTTPS, IM, printer drivers, etc.
  CONDITION—the conditions under which the DLP system takes the actions. The conditions define what is considered to be sensitive data.
  ACTION— Log, Alert, Block, Notification, Forensic Analysis, Justification, Encryption, etc.

Model 2 for Data-at-Rest: If data resides at TARGET with CONDITION, then do ACTION.
  TARGET—an individual endpoint/user, a group of endpoints/users, or all endpoints/users.
  CONDITION—the conditions under which the DLP system takes the actions. The conditions define what is considered to be sensitive data.
  ACTION— Log, Notification, Encryption, Deletion, etc.

The two DLP security policy models disclosed above advantageously provide generically-applicable DLP security policies. As shown above, an advantageously well-defined DLP security policy for data-in-motion consists of 4 parts—TARGET, CHANNEL, CONDITION and ACTION, while an advantageously well-defined DLP security policy for data-at-rest consists of 3 parts—TARGET, CONDITION and ACTION.

Digital Asset Objects (Layer 1)

In accordance with an embodiment of the invention, there may be four classes of digital asset objects to describe sensitive information contained in a file. These four classes are document fingerprints, regular expression patterns, keywords, and file attributes.

Document fingerprints—Each fingerprint object presents document fingerprints generated from a collection of documents, usually it may consists of all files under one folder. An alternate term for this object is a document signature. The fingerprints or signatures may be generated by the methods described in patent with U.S. Pat. No. 7,516,130.

Regular expression patterns—Each pattern object is defined by regular expression. An object may have a function with value validation. For example, a credit card number (CCN) may be validated based on its checksum and other additional information. Another example of data which is subject to a regular expression pattern is social security number (SSN).

Keywords—Each keyword object is a list of keywords ("dictionary" of keywords).

File attributes—File attributes may include file size, file extension, file type, writing languages, encoding char set, authors, archive depth and many others.

These four classes of digital asset objects may be considered to be the foundation of the framework. The framework also allows for the addition of other classes of digital asset objects if there are any. In accordance with an embodiment of the invention, attributes and methods may be assigned to each class of digital asset objects. For example, the attributes and method may be as specified below.

Document Fingerprint Class:
Attributes
  ID—A unique string serving as the object ID.
  Name—The name of the specific object instance.
  Description—A brief summary of the document collection.
  Repository type—Specifies in what data storage system the document collection is located. It could be, for example, Window Share, NFS, Share Point, etc.
  Host name—The server where the documents reside.
  Path—The directory where the documents are located.
  User ID—User ID for accessing the document server.
  Password—Password for the User ID
  Filters
    Include-Filter—specifies the file attributes such as file names, extensions, file types, etc., so that only the documents with these attributes are included for fingerprinting.
    Exclude-Filter—specifies the file attributes so that documents with these attributes are excluded from fingerprinting.
    Date Range—specifies the time range when the documents are created to be included for fingerprinting.
    And other filters.
Methods
  Get-match-level( )—The match level specifies how much sensitive information the leaked document contains against the specified document collection. The match levels may include, for example, High, Medium and Low. The match level is determined by how many number of common fingerprints shared between the leaked document and any document from the classified document collection.

Regular Expression Pattern Class:
Attributes
  ID—A unique string serving as the object ID.
  Name—The name of the specific object instance.
  Description—A brief summary of what is represented by the regular expression pattern.
  Type—There may be 3 types of patterns including 2 optimized pattern types.

Type 1—Generic patterns that cannot be readily optimized.

Type 2—Patterns which are of a small alphabet.

Type 3—Patterns with fixed length suffix string. This suffix string is of a small alphabet.

Additional Information needed by latter two pattern types.

Character set of the alphabet.

Minimum length of pattern.

Maximum length of pattern.

Length of suffix string for Type 3.

Case sensitivity—YES or NO

Validation function name—this indicates the function to validate the value. This validation is important in that it can reduce or minimize false positives. The validation function may be built with the following two options:

The validation function may be included in a dynamic library, such as a DLL (dynamic link library), for programming languages such as C/C++ and Java. The dynamic library may be deployed to the endpoints in demand.

A special scripting language may be designed for the validation function. Such a scripting language may be interpreted by the DLP policy engine.

Methods

Get-number-of-instance( )—Specifies how many occurrences the specified patterns appear in document.

Keyword Class:

Attributes

ID—A unique string serving as the object ID.

Name—The name of the keyword dictionary.

Description—A brief summary what the dictionary represents.

Dictionary—a list of keywords

Each keyword is assigned a score.

Each keyword is specified as case sensitive or not.

Methods

Is-all-matched( )—Used to determine whether all keywords in the dictionary appear in the document.

Is-all-matched-in-range-of (m)—Used to determine whether all keywords in the dictionary appear within the range of m characters in the document.

Is-any-matched( )—Used to determine whether any keyword in the dictionary appears in the document.

Does-score-exceed (m)—Used to determine whether all keywords with scores in the document add up to exceed m.

File Attribute Class:

Attributes

ID—A unique string serving as the object ID.

Name—The name of the file attribute object.

Description—A brief summary what the file attribute object represents.

Methods

Is-file-type-as(type list)—Used to determine whether the document belongs to any of the file types specified.

Is-file-size-in-range(range)—Used to determine whether the size of the document is in the range specified.

Does-file-name-with-extension(ext)—Used to determine whether the name of the document has the specified extension.

Is-archive-length-less-than(depth)—Used to determine whether the depth of the archive file is less than what is specified.

Do-authors-include(name list)—Used to determine whether the document is written by any one of the specified list of authors.

Is-language-as(language-name)—Used to determine whether the document is written in the specified language, for example, Chinese or Russian.

Content Templates (Layer 2) and Use Thereof

In accordance with an embodiment of the invention, content templates are used to define the CONDITION part of a DLP policy. A content template may be associated with a digital asset object or a group of digital asset objects. Within the group, the digital asset objects may be associated with Boolean operations.

Figure 3:
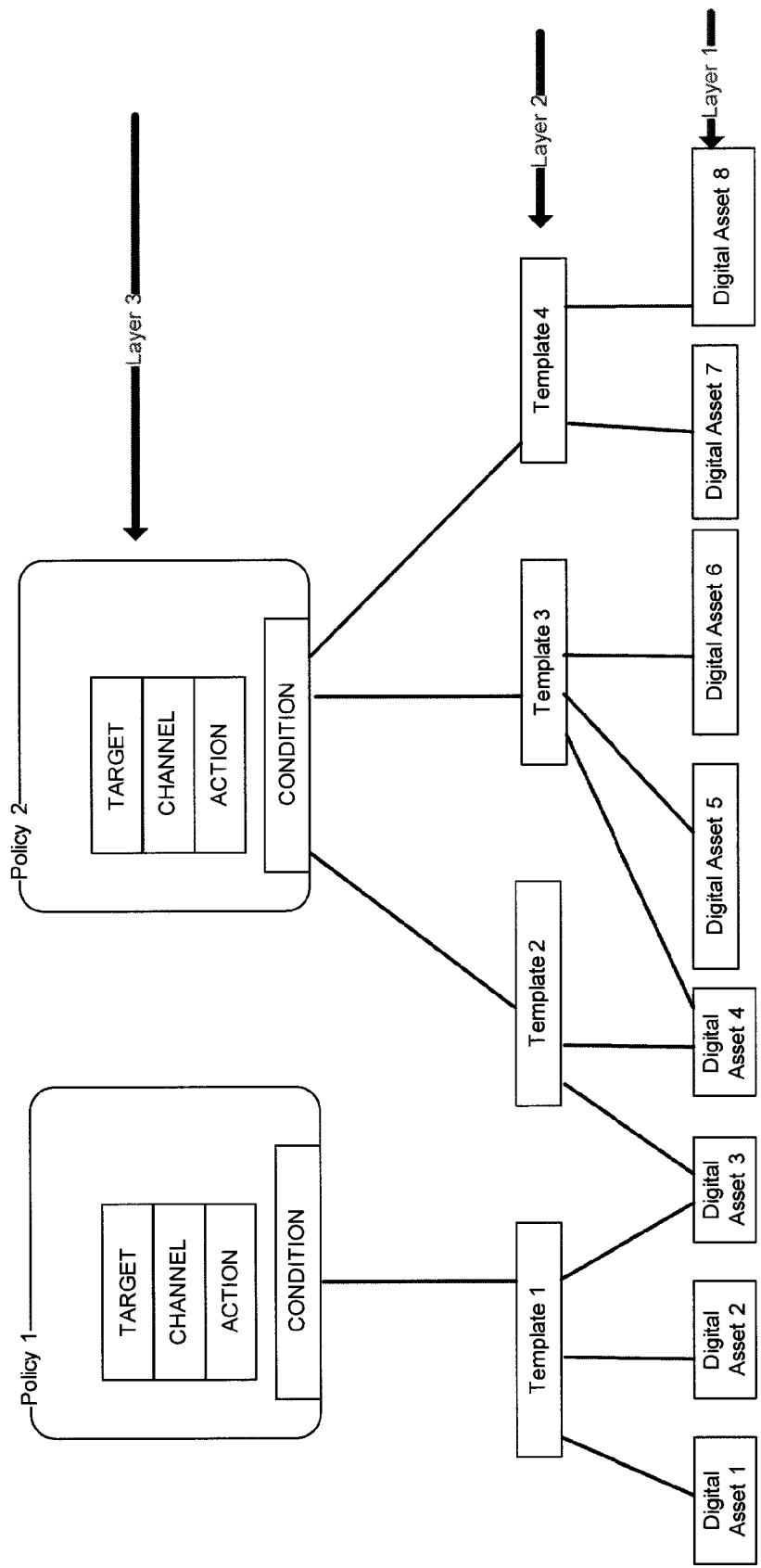
FIG. 3 provides an example system using the three-layer structure for DLP security policies in accordance with an embodiment of the invention.

Consider the example depicted in FIG. 3. In the illustrated example, there are eight digital assets. For instance, the eight digital assets may be as follows.

1. A collection of documents for company marketing strategy
    Object Type—document fingerprint
    ID—TopSecret
    Name—Top Secret Document
    etc.
2. A collection of C/C++ and Java source code files
    Object Type—document fingerprint
    ID—SourceCode
    Name—Source code of C/C++ and java
    etc.
3. US Social Security Number
    Object Type—regular expression pattern
    ID—SSN
    Name—US Social Security Number
    etc.
4. Credit Card Number
    Object Type—regular expression pattern
    ID—CCN
    Name—Credit Card Number
    etc.
5. C/C++ Keywords
    Object Type—Keyword
    ID—CppCode
    Name—C/C++ Source Code Keywords
    etc
6. Java Keywords
    Object Type—Keyword
    ID—JavaKeyword
    Name—Java Source Code Keywords
    etc
7. Personal Information Keywords
    Object Type—Keyword
    ID—PInfoKeyword
    Name—Keywords of personal information
    etc
8. Marketing document attribute
    Object Type—File attribute
    ID—MarketDocAttr
    Name—Market document attributes
    etc Based on the well-defined digital assets above, several content templates may be created to serve the definition of DLP policies. As shown in FIG. 3, each content template may be associated with a digital asset or a grouping of digital assets.

Content templates may be created to protect specific types of sensitive data. For instance, the example content templates below are tailored to protect marketing strategy documents, source code files, and personal information, respectively.

Template 1:
  Purpose—To protect marketing strategy documents
  Template Definition
    TopSecret.Get-match-level( )≥Medium AND MarketDocAttr.Is-file-type-as(WORD, PPT, PDF)
    TopSecret.Get-match-level( )≥High
The sub-clauses of the template are associated with Boolean operation OR. So the template presentation above is equivalent to the following statement:
  [TopSecret.Get-match-level( )≥Medium AND MarketDocAttr.Is-file-type-as(WORD, PPT, PDF)] OR TopSecret.Get-match-level( )≥High
This convention applies to the other templates below.
Template 2:
  Purpose—To protect source code file
  Template Definition
    SourceCode.Get-match-level( )≥Low
    CppCode. Does-score-exceed (10)
    JavaKeyword. Does-score-exceed (16)
Template 3:
  Purpose—To protect personal information
  Template Definition
    SSN.Get-number-of-instance( )≥2
    CCN.Get-number-of-instance( )≥2
    SSN.Get-number-of-instance( )≥1 AND CCN.Get-number-of-instance( )≥1
    [SSN.Get-number-of-instance( )≥1 OR CCN.Get-number-of-instance( )≥1] AND PInfoKeyword. Is-all-matched-in-range-of (100)

Content templates may also include compliance templates. Compliance templates are configured to satisfy specific regulatory requirements, such as may be imposed by the various compliance regimes mentioned above.

Figure 4:
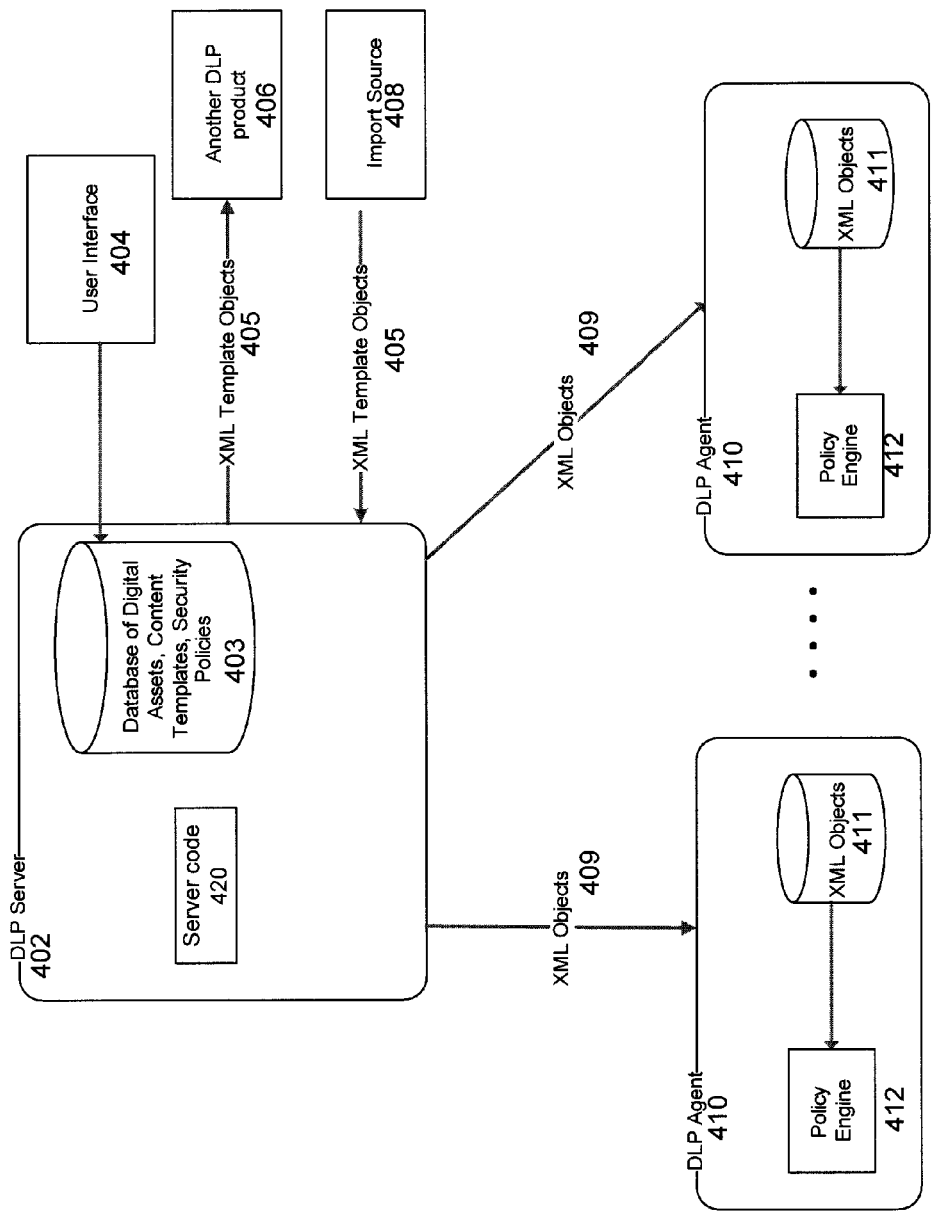
FIG. 4 is a schematic diagram showing the creation and deployment architecture for DLP security policies in accordance with an embodiment of the invention.

As discussed above, a DLP security policy for data-in-motion consists of four parts:
  TARGET
  CHANNEL
  CONDITION
  ACTION
And a DLP security policy for data-at-rest consists of three parts:
  TARGET
  CONDITION
  ACTION
Both classes of DLP policies contain a CONDITION which may be composed by the content templates. The following policy examples illustrate how the DLP security policies may be created based on pre-defined content templates.
Example Policy 1 (for data-in-motion)
  Use case—The company wants to monitor all source code files and personal information that are sent to outside from all endpoints.
  Policy Definition
    TARGET=All users OR All endpoints
    CHANNEL=Email OR Webmail OR Removable Driver OR IM OR FTP
    CONDITION=Template 2 OR Template 3
    ACTION=Log AND Alert AND Notification
Example Policy 2 (for Data-at-Rest)
  Use case—The company wants to know who has personal information on their PC which they should not own.
  Policy Definition
    TARGET=All users except HR
    CONDITION=Template 3
    ACTION=Log AND Notification
Example Policy 3 (for Data-in-Motion)
  Use case—The company wants to block any marketing strategy documents leaking from all staffs of marketing team and CEO office via web mails, instant messenger and removable driver (such as USB key).
  Policy Definition
    TARGET=All users of marketing team OR All users of CEO office
    CHANNEL=Webmail OR IM OR Removable Driver
    CONDITION=Template 1
    ACTION=Block AND Alert AND Log Creation and Deployment Architecture FIG. 4 is a schematic diagram showing the creation and deployment architecture for DLP security policies in accordance with an embodiment of the invention. As shown, a DLP server 402 may be configured with a database system 403 to store and provide access to the three layers of objects, namely the digital assets, content templates and security policies. A web console or other user interface 404 may be used to by a user to manually compose (create and edit) the three layers of objects. Edited objects may be saved into the database 403 at the server 402.

The DLP server 402 may be configured with server code 420 to retrieve the objects from database system 403 and translate them into XML (extensible markup language) objects. In accordance with an embodiment of the invention, XML template objects 405 may be exported from the DLP server 402 to another DLP product 406 and may be imported to the DLP server 402 from an import source 408.

The DLP server 402 may interact with multiple DLP agents 410. The DLP agents 410 may be endpoint-based agents or gateway-based agents. The DLP server 402 may push XML objects 409 to the DLP agents 410. The XML objects may be kept in a database 411 at each DLP agent 410. Each DLP agent 410 is configured with a policy engine 412 that may be used to interpret all three layer objects and therefore execute the DLP security policies.

CONCLUSION

The present application discloses a unified framework for DLP security policies which overcomes shortcomings in conventional DLP security policy solutions. In one embodiment, the unified framework comprises a three-layer structure which provides a generically-applicable and scalable framework for DLP security policies.

The features and advantages described in the specification provide a beneficial use to those making use of a system and a method as described in embodiments herein. For example, a user is provided mechanisms, e.g., by receiving and/or transmitting control signals, to control access to particular information as described herein. Further, these benefits accrue regardless of whether all or portions of components, e.g., server systems, to support their functionality are located locally or remotely relative to the user.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Upon reading this disclosure, those of skill in the art will appreciate still additional alternative structural and functional designs for a system and a process for a matching engine to query relevant documents, which may include a signature generation and relevance detection through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. An apparatus for creating and managing security policies for data leakage prevention (DLP), the apparatus comprising:
    a computer server;
    server code on the computer server;
    a database which is accessible by the server code and which stores a three-layer structure of objects comprising a first layer of digital asset objects which describe sensitive information contained in a file, a second layer of content template objects which are each associated with at least one digital asset object, and a third layer of security policy objects which each contain a condition which depends on at least one content template object, wherein the security policy objects are modeled in at least two models including a first DLP policy model for use in preventing leakage of sensitive data-in-motion and a second DLP policy model for use in discovering sensitive data-at-rest; and
    a user interface configured to access said database so as to provide for input and editing of said three layers of objects.

2. The apparatus of claim 1, wherein said security policy objects comprise a target element, an action element, and a condition element, wherein the condition element specifies at least one of the content template objects.

3. The apparatus of claim 2, wherein said security policy objects which cover the data-in-motion further comprise a channel element,
    further wherein the first DLP policy model implements logic such that if data flows from a first target element outside a network via a first channel element with a first condition element, then a first action element is performed,
    further wherein the second DLP policy model implements logic such that if data resides at a second target element with a second condition element, then a second action element is performed, and
    further wherein the digital assets objects are classified in four classes including a document fingerprint class, a regular expression pattern class, a keyword class, and a file attribute class.

4. The apparatus of claim 2, wherein said target element is configurable to cover endpoints and/or users of an organization's data network.

5. The apparatus of claim 2, wherein said action element is configurable to include logging, alerting, or blocking.

6. The apparatus of claim 2, wherein said condition element defines sensitive data being covered.

7. The apparatus of claim 6, wherein a content template object is used to form said condition element, further wherein the content template object is associated with a digital asset object or a group of digital asset objects, further wherein the content template object comprises a plurality of sub-clauses associated with Boolean operator OR.

8. The apparatus of claim 3, wherein said channel element is configurable to cover data communication channels including at least electronic mail, hypertext transfer protocol, and drivers for removable storage.

9. The apparatus of claim 1, wherein said digital asset objects include objects which are members of a document fingerprint class and objects which are members of a regular expression class.

10. The apparatus of claim 9, wherein said digital asset objects further include objects which are members of a keyword class and objects which are members of a file attribute class.

11. The apparatus of claim 1, wherein the server code is configured to translate the digital asset, content template, and security policy objects from the database into extensible markup language (XML) objects.

12. The apparatus of claim 11, wherein the user interface is further configured to import and export said content template objects in the form of said XML objects.

13. The apparatus of claim 11, further comprising:
a plurality of data leakage prevention agents in an organization's network,
wherein the server code is further configured to push said XML objects to said agents.

14. The apparatus of claim 13, wherein said agents each include a policy engine that is configured to interpret said XML objects and to execute said security policies contained in said XML objects.

15. The apparatus of claim 1, wherein said content template objects include compliance templates which are configured to satisfy specific regulatory requirements.

16. The apparatus of claim 1, wherein said content template objects include templates to protect marketing strategy documents, templates to protect source code files using source code keywords, and templates to protect personal information.

17. A data leakage prevention apparatus comprising:
a database configured to store a three-layer structure of objects comprising a first layer of digital asset objects which describe sensitive information contained in a file, a second layer of content template objects which are each associated with at least one digital asset object, and a third layer of security policy objects which each contain a condition which depends on at least one content template object, wherein the security policy objects are modeled in at least two models including a first DLP policy model for use in preventing leakage of sensitive data-in-motion and a second DLP policy model for use in discovering sensitive data-at-rest; and
a policy engine configured to interpret said digital asset, content template, and security policy objects so as to execute security policies contained in said objects.

18. The apparatus of claim 17, wherein the apparatus comprises a data leakage prevention agent in an organization's network, and wherein said digital asset, content template, and security policy objects are received from a data leakage prevention server.

19. The apparatus of claim 17, wherein said content template objects include compliance templates which are configured to satisfy specific regulatory requirements.

20. The apparatus of claim 17, wherein said content template objects include templates to protect marketing strategy documents, templates to protect source code files using source code keywords, and templates to protect personal information.

\* \* \* \* \*